United States Patent

Choi et al.

[15] 3,706,948

[45] Dec. 19, 1972

[54] COMB-LINE FILTER STRUCTURE HAVING REDUCED LENGTH AND WIDTH

[72] Inventors: Charles Choi, Hoffman Estates; Maynard H. McGhay, Schaumburg, both of Ill.

[73] Assignee: Motorola, Inc., Franklin Park, Ill.

[22] Filed: Feb. 18, 1971

[21] Appl. No.: 116,376

[52] U.S. Cl. .............333/73 C, 317/249 T, 333/82 B

[51] Int. Cl. ............................H01p 1/20, H01p 7/04

[58] Field of Search ..........333/70, 73 C, 73 W, 82 B; 334/45

[56] References Cited

UNITED STATES PATENTS 2,239,905 4/1941 Trevor ..............................333/73 C 3,277,406 10/1966 Ocker ..............................333/73 C 2,968,012 1/1961 Alstader ..............................333/73

3,328,670 6/1967 Parker ..............................333/73 C

*Primary Examiner*—Paul L. Gensler

*Attorney*—Mueller & Aichele

[57] ABSTRACT

The comb-line filter is formed by a housing and a plurality of U-shaped resonator elements each having one end connected directly to the grounded housing and the other end connected to the housing through a lumped capacitor. Each of a first set of partitions is disposed between the legs of the U-shaped elements to form a coaxial structure therewith and each of a second set of partitions is disposed either between adjacent resonator elements, between adjacent lumped capacitors, or between an adjacent resonator element and lumped capacitor to control the coupling between resonant cells.

12 Claims, 5 Drawing Figures

PATENTED DEC 19 1972

3,706,948

Inventors
MAYNARD H. McGHAY
CHARLES CHOI

BY Mueller & Aichele

ATTYS.

COMB-LINE FILTER STRUCTURE HAVING REDUCED LENGTH AND WIDTH

BACKGROUND OF THE INVENTION

The design trend of modern electronic equipment has been to provide more sophisticated circuitry in increasingly smaller packages. The use of frequency selective filters has increased as equipment has become more complex thereby enabling electronic systems to meet tighter specifications. For instance, highly selective preselector or bandpass networks are now required at the inputs of most sensitive receivers to attenuate unwanted signals while passing desired signals to the input stages. Because the desired signal is usually very low in amplitude and the unwanted signals, including noise, may be of appreciably greater amplitude, the preselector network must present a low loss to the desired signal and a high attenuation to the undesired signals. Consistent with the trend toward miniaturization, there have been many attempts to create light weight preselector filters which take up a minimum amount of space.

Such filters are sometimes required to have a passband, center frequency of hundreds of megacycles and a bandwidth which is a fraction of a percent of the center frequency. There are several types of passive filters with distributed parameters such as: comb-line, transmission-line and cavity types e.g., helical, coaxial and wave guide filters, which may be designed to meet the above electrical specifications. However, the foregoing known filter structures may be unable to meet physical specifications such as length, width, depth or weight requirements imposed, for instance, by a hand held transceiver structure.

In the past, the "comb-line" filter has been employed where cost and space requirements are restrictive. This filter includes resonant cells or transmission-line elements placed side by side in a tandem fashion and thus results in a more compact structure than, for example, a "transmission-line" filter which includes transmission line elements arranged in a cascaded manner. Each of the transmission-line elements in the comb-line filter has an inductor or resonator element with one end short circuited to ground and a lumped capacitance connected between the other end of the resonator element and ground. It is usually desirable to make the end loading or lumped capacitance in this filter large so that the length of the resonator will be less than one-quarter wavelength but greater than one-eighth wavelength at the center frequency. There are, however, limits to the shortness of the length of the resonator element. More particularly, as the resonator element is shortened to be less than one-quarter wavelength, the effective inductance presented thereby is decreased thus requiring a greater amount of lumped capacitance to resonate therewith at a given frequency. More importantly, as the length is decreased the maximum Q or quality factor of the filter is reduced thus limiting the selectivity or narrowness of the bandwidth of the filter. Thus, the minimum length of a prior art comb-line filter is determined by the minimum electrical length of the resonator elements included therein. This length may require a housing which is too long for some applications.

Moreover, the coupling between the resonant cells of the prior art comb-line filters is adjusted by changing the distance therebetween. Thus, the width of a housing for such filters is dependent upon the required degree of intercoupling. If the desired bandwidth is a small percentage of the center frequency which may be the case at high frequencies, the required coupling may have a low magnitude. Therefore, the cells of the prior art comb-line filter may require substantial distances therebetween thus resulting in a housing of excessive width.

SUMMARY OF THE INVENTION

It is an object of the present invention to provide a comb-line filter having a compact structure.

Another object is to provide a comb-line filter which is easy and inexpensive to manufacture.

Still another object is to provide a comb-line filter having a narrow bandpass characteristic and a physical length which is substantially less than that required by prior art comb-line filters meeting the same specifications.

A further object is to provide a comb - line filter structure having a width which is substantially independent of the required bandwidth of the filter.

A still further object is to provide a comb-line filter structure which is suitable for use in a hand held communication receiver or transceiver and which is capable of being expanded to include a desired number of resonant cells.

In brief, the improved comb-line filter structure of one embodiment of the invention is comprised of a closed conductive housing having therein U-shaped resonator elements, lumped end loading capacitors and two sets of partitions. One end of each resonator element is connected to a first portion of the housing. Each of a first set of partitions also has one end thereof fastened to the first portion of the housing and extends between the legs of a resonator element. The other end of each of the resonator elements is connected to the first portion of the housing by a lumped capacitor. Because of the U-shaped configurations of the resonator elements, the physical length of the filter is only about one-half the electrical length thereof. Each of a second set of partitions is included between either adjacent resonator elements, adjacent capacitors or adjacent resonator element- capacitor combinations, to selectively control electromagnetic coupling through the filter. The basic structure of the filter can be readily adapted to provide two or more resonant cells or networks depending upon the specifications to be met by the filter. Since the partitions can be adjusted to control the interstage coupling, the width of the filter is substantially independent of the required bandwidth.

DETAILED DESCRIPTION OF THE PREFERRED EMBODIMENT

Figure 1:
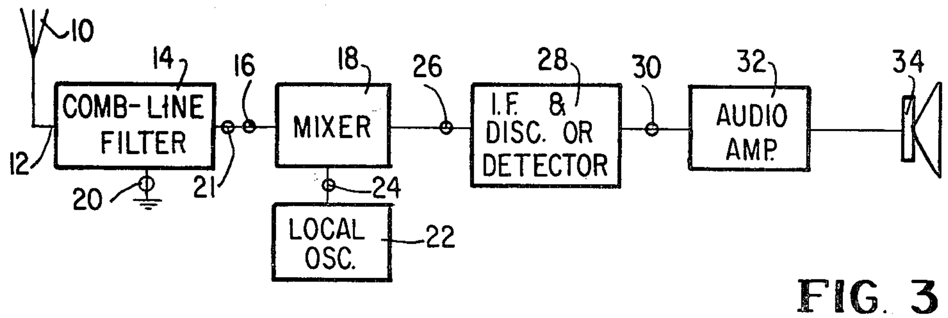
FIG. 1 is a block diagram of a communications receiver including the filter of one embodiment of the present invention.

In FIG. 1, the block diagram of a communication receiver is shown, which employs a comb-line filter of one embodiment of the invention. Antenna 10 is connected to first terminal 12 of comb-line filter 14. Second terminal 20 of comb-line filter 14 is connected to a ground or reference potential, and third terminal 21 is connected to first input 16 of mixer 18. Thus, the filter shunts the input of the receiver. Local oscillator 22 is connected to a second input 24 of mixer 18. Input 26 of block 28, which includes an intermediate frequency (IF) amplifier and a discriminator or detector, is connected to the output of mixer 18. Input 30 of audio amplifier 32 is connected to the output of block 28, and loud speaker 34 is connected to the output of audio amplifier 32.

Antenna 10 receives desired signals, which fall within a narrow frequency band; and undesired signals which have spectral components throughout the radio frequency spectrum. These undesired signals may be information transporting waves generated by other radio frequency transmitters or they may be noise waves created by lightning, ignition systems of automotive vehicles, electric motors and generators, etc. It is desirable that only signals within the narrow operating band of the receiver be applied from antenna 10 to mixer 18. Otherwise, undesired signals, having special components outside of the desired passband, might mix with each other or with the local oscillator signal from oscillator 22 to produce an undesired signal component at the IF frequency which would then be amplified by amplifiers 28 and 32, and reproduced by loud speaker 34. Therefore, the ideal function of comb-line filter 14, as employed in a communications receiver, is to provide a low impedance path to ground for all spectral components except those falling within the desired operating band of the receiver and to provide a high impedance to the desired signals so that they are applied to input 16 of mixer 18. A comb-line filter may be designed to perform either as a preselector or it may work in combination with a preselector, which could be inserted in the block diagram of FIG. 1 just before mixer 18. In the latter case the comb-line filter is called an "antenna filter."

Figures 2, 3, 4, 5:
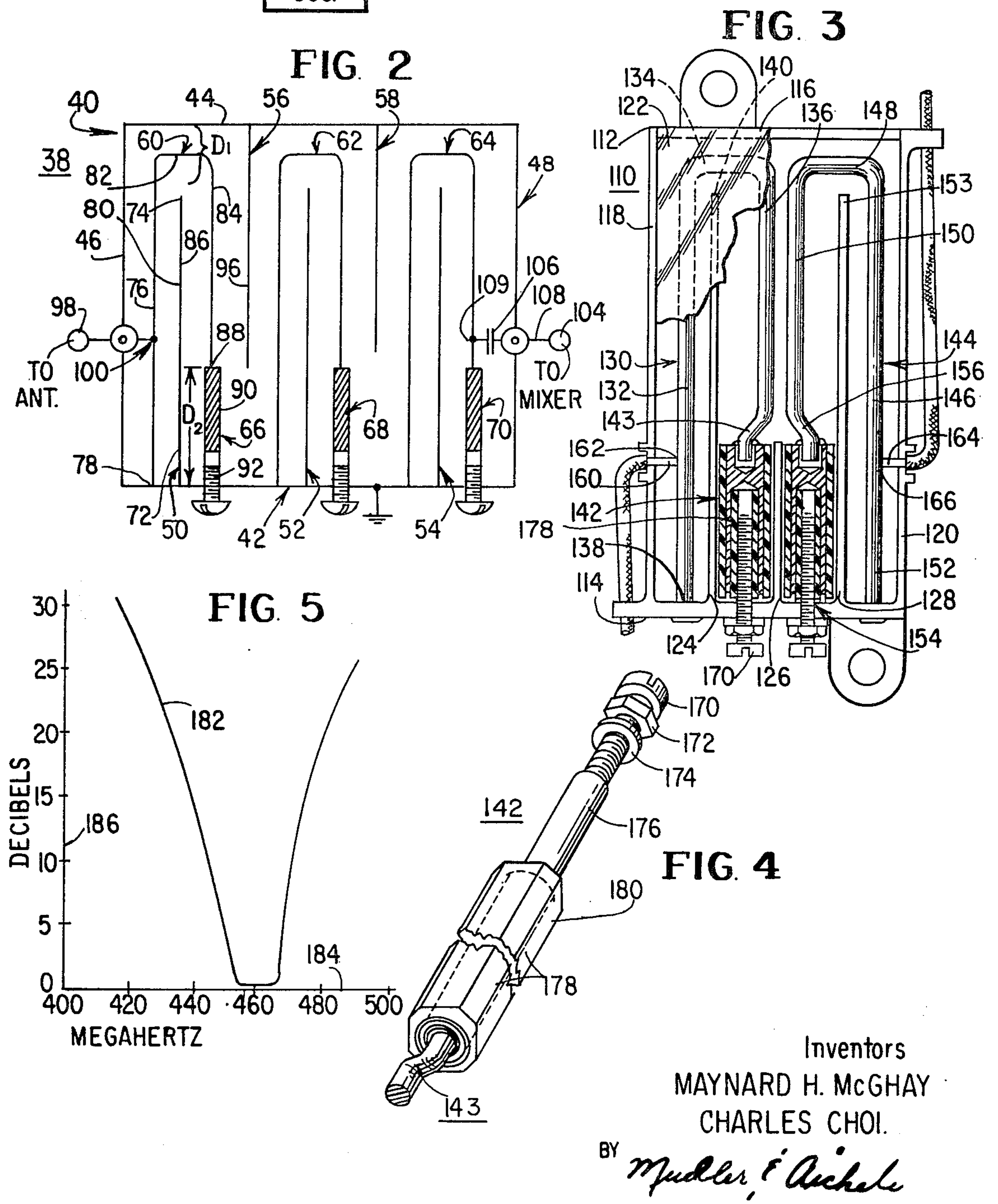
FIG. 2 is a schematic diagram of a comb-line filter of one embodiment of the invention which has a structure that is capable of being expanded to include a multiplicity of resonant networks.
FIG. 3 is a drawing of the structure of one embodiment of a comb-line filter of the invention which includes two resonant networks.
FIG. 4 is a partly exploded perspective view of an end loading capacitor which is suitable to be included in the comb-line filters of FIGS. 2 and 3.
FIG. 5 is a graph of the attenuation verses frequency response of the comb-line filter of FIG. 3.

In the past, particularly in hand held communication devices, the use of comb-line filters has been restricted because of the physical length thereof which has been determined by the electrical length of its resonator elements. FIG. 2 illustrates comb-line filter 38 of one embodiment of the invention wherein the resonator element has been formed in a U-shape thereby substantially reducing the required physical length of the filter necessary to provide a given electrical length. Housing 40 of the filter of FIG. 2 includes a first end wall 42 and a second end wall 44. The first end wall may be connected to a ground or reference potential. Side walls 46 and 48 join end walls 42 and 44, and first and second covers (not shown) are affixed to the end and side walls to form a closed box-like housing with an enclosure therein. A conductive coating, e.g. silver, is plated on all inside surfaces of the housing to reduce "skin" losses.

The housing includes a first set of thin rectangular partitions 50, 52 and 54 which are electrically and mechanically connected to first end wall 42. A second set of these rectangular partitions 56 and 58 extend from second end wall 44 into the enclosure. The rectangular partitions extend between the first and second cover plates thereby dividing the enclosure into compartments. U-shaped resonator elements 60, 62 and 64 are each comprised of three integral portions. The resonator elements may be formed from heavy conductive wire having circular cross-section. End loading capacitors 66, 68 and 70 are connected between end wall 42 and one end of resonator elements 60, 62, and 64, respectively. The partitions and the resonator elements are either composed of or coated by conductive material.

Each resonator element, the surfaces of the housing walls and partitions, and the capacitor associated therewith form a resonant network or cell. For instance, the input cell of filter 38 is formed by the cooperation of partitions 50 and 56, resonator element 60, capacitor 66, portions of end walls 42 and 44 and side wall 46 and associated surfaces of the cover plates. Partition 56 also controls the electromagnetic coupling from this input cell to the second cell which includes partitions 56 and 52, resonator element 62 and capacitor 68. Similarly, partition 58 controls the electromagnetic coupling from the second cell to the third cell which includes resonator element 64, partitions 54 and 58, and capacitor 70. Although filter 38 is illustrated as being a three cell filter, it is apparent that additional resonant networks or cells could be added in a tandem manner between the second and third cells so that particular selectivity specifications can be met by the filter.

The input resonant network or cell of the filter of FIG. 2 will now be described in greater detail. Partition 50 has a first end 72 which is electrically and mechanically connected to end wall 42. The body of partition 50 extends into the enclosure formed by the housing and the second end 74 thereof is located a first distance, $D_1$ from second end wall 44. First resonator element 60 is comprised of first, second and third portions. First portion or leg 76 has an end 78 electrically and mechanically connected to first end wall 42 and a body which is juxtapositioned along first side 80 of partition 50 and which extends past end 74 thereof. Second portion 82 of the resonator element runs parallel to end wall 44 and extends between end 74 of partition 50 and end wall 44. Third portion or leg 84 is juxtapositioned along side 86 of partition 50 and has an end 88 which is located a second distance, $D_2$ away from end wall 42.

Capacitor 66, which extends from resonator end 88 to end wall 42, is comprised of a first plate 90 which may be a cylindrical sleeve and a second plate 92 which may be a screw or other adjustable member which is in mating and electrical contact with end wall 42. The distance between the screw 92 and the end of cylinder 90 is the thickness of the dielectric between the two plates. Since the capacitance of a capacitor is a function of the effective area of its plates and since adjustment of screw 92 changes this plate area by varying the surface area of the screw enclosed by the cylinder, screw 92 is utilized to adjust the capacitance of capacitor 66.

Generally, in designing comb-line filters, resonant structures having distributed electrical parameters such as coaxial lines are utilized in cooperation with a lumped capacitance. The electrical length of the coaxial line is usually chosen to be between one-fourth and one-eighth the wavelength of the frequency at the center of the passband so that it presents an equivalent inductance at this center frequency. Lengths shorter than one-eighth wavelength are usually not employed because the Q or quality factor of the filter tends to decrease as the length of the coaxial or resonant element is decreased. Also, the magnitude of the capacitances of the lumped capacitor must be increased as the length of the coaxial line is decreased.

In the filter of FIG. 2, portions of the first and second cover plates, side wall 46, partition 50 and first portion 76 of resonator 60 form the first part of a coaxial cell or resonant network which has a characteristic impedance dependent upon the ratio of the diameter of the cross-sectional area of the resonator element to the cross-sectional area of the compartment formed between side wall 46, partition 50 and the associated portions of the first and second cover plates. Similarly, second resonator portion 82, the part of end wall 44 extending from side wall 46 to partition 56 and end 74 of partition 80 form a second part of the coaxial cell or structure. Finally, surface 86 of partition 50, third resonator portion 84 and surface 96 of partition 56 form the third part of the coaxial structure. The total electrical length of the three connected coaxial portions may be chosen to be about one-eighth of a wavelength but the physical length of filter 38 is only a little over one-sixteenth wavelength. End loading capacitor 66, in effect, adds enough electrical length to the equivalent electrical length of the coaxial portions so that the combination of the capacitor and coaxial portions resonates at the desired frequency.

Because of the discontinuity created by the connection of end 88 of third portion 84 of resonator element 60 to plate 90 of capacitor 66, the electromagnetic field radiated from third portion 84 and the electromagnetic field radiated from plate 90 tend to be out-of-phase with each other. Thus, only the field from the capacitor or the field from the element should be coupled into the second cell. Therefore, partition 56 can either extend from end wall 42 to the discontinuity, thus shielding the capacitor, or from end wall 44 to the discontinuity (as shown), thus shielding the resonator, so that only one or the other of the out-of-phase fields cuts across resonator element 62 of the second cell. Regardless of the end wall from which partition 56 extends, the partition can be extended farther past the discontinuity thereby decreasing the magnitude of the inter coupling field to facilitate bandwidth adjustment. Partition 56 serves both as a portion of the outer wall of the third portion of the coaxial element and as a means of controlling the magnitude and phases of the coupling between resonant elements. This type of coupling enables filter 38 to have a predetermined width whereas coupling between prior art resonant cells, which depended on the spacing of the resonant elements with respect to each other, resulted in a housing width determined by the degree of coupling. Since coupling in filter 38 of FIG. 2 can only occur between the juxtapositioned parts of capacitor 66 and the portion of resonator element 62 which is not shielded by partition 56, filter 38 can be used in electronic applications where narrow bandwidths are required.

In the filter configuration of FIG. 2 input terminal 98 is connected through an aperture in side wall 46 to a selected point 100 on first leg portion 76 of resonator element 60. The exact point of connection is empirically determined to match the output impedance of the antenna to the input impedance of the filter to facilitate maximum power transfer into the filter. Moreover, output terminal 104 is connected through side wall 48 to a first plate of coupling capacitor 106 by conductor 108. The other plate of capacitor 106 is connected to resonator element 64 at point 109. Capacitor 106 transforms the high impedance at point 109 on element 64 so that it appears as a comparatively smaller impedance at output terminal 104 to facilitate maximum power transfer to a relatively low impedance. If the filter is employed to drive a high impedance, then capacitor 106 may be eliminated by a direct connection between point 109 and terminal 104.

Another arrangement of a comb-line filter of the invention is illustrated by the mechanical view of FIG. 3. Filter 110 of FIG. 3, which is drawn at about twice its actual scale so that the parts thereof can readily be seen, was designed to operate at a center frequency of 460 MHz. The dimensions of the filter are 2 inches by 1 inch by one-quarter inch.

Filter 110 includes housing 112 having end walls 114 and 116, and side walls 118 and 120. First and second covers cooperate with the walls to form an enclosure. Portion 122 of one of the covers is shown in FIG. 3. Partitions 124, 126 and 128 extend into the enclosure.

First U-shaped resonator element 130 is comprised of first, second and third portions which are respectively designated by reference numbers 132, 134 and 136. End 138 of portion 132 is electrically and mechanically connected to end wall 114. Portion or leg 132 is juxtapositioned along a first side of partition 124; portion 134 is placed between end 140 of partition 124 and end wall 116; and, portion or leg 136 is juxtapositioned along a second side of partition 124. Capacitor 142 is connected between end 143 of portion 136 and end wall 114.

Second U-shaped resonator element 144 is also comprised of first, second and third portions which are respectively designated by reference numbers 146, 148 and 150. End 152 of portion 144 is electrically and mechanically connected to end wall 114. Portion or leg 146 is juxtapositioned along a first side of partition 128, portion 148 is placed between end 153 and end wall 116; and, portion or leg 150 is juxtapositioned along a second side of partition 128. Capacitor 154 is connected between end 156 of portion 144 and end wall 114.

Second resonator element 144 of filter 110 along with its associated capacitor 154 are displaced with respect to the positions of the resonator element and capacitor of the second cell of filter 38. More specifically, the third portion 150 of second resonator element 144 of filter 110 runs adjacent the third portion 136 of element 130 whereas the first portion of the resonator element 62 of filter 38 runs adjacent the third portion 84 of element 60. Moreover, partition or coupling shield 126 of filter 110 extends from end wall 114, rather than from end wall 116, thus allowing coupling between adjacent portions of resonator elements 130 and 144, rather than between an adjacent capacitor-resonator element structure as in FIG. 2. Partition 126 of FIG. 3 could be moved so that it extends down into the enclosure from end wall 116 thereby facilitating coupling between the capacitors 142 and 154; however, as will be subsequently explained, there are advantages resulting from placing partition 126 between capacitors 142 and 154.

Input conductor 160 is connected to low impedance point 162 on first portion 132 of resonator element 130. Output conductor 164 is connected to low impedance point 166 on first portion 146 of resonator element 144 to provide efficient power transfer from the output of the filter to the input of a low impedance circuit without requiring the use of a coupling capacitor similar to capacitor 106 of FIG. 2.

The structure of capacitor 142 which may be similar to the structure of capacitors 66, 6, 70 and 154 will now be described. Provided that partition 126 is located between the capacitors as shown in FIG. 3, either capacitor 142 or capacitor 154 may be considered to be a composite of two separate capacitors in parallel. Referring now to FIGS. 3 and 4 screw 170 extends through a threaded aperture in end wall 114 of the housing and forms the first plate of the first capacitor of composite capacitor 142. Nut 172 and washer 174 cooperate with the aperture to lock screw 170 in place after the resonant frequency of the network has been adjusted. Resilient sleeve 176 of FIG. 4 receives screw 170 after it passes through end wall 114. The second plate of the first capacitor and the first plate of the second capacitor is formed by tubular metal sleeve 178 which is electrically connected to end 143 of resonator element 136. The first capacitor is included in rectangular block or body 180 which is formed from plastic or some other dielectric material. The second plate of the second capacitor is formed by partitions 124 and 126, and the associated portions of the first and second cover plates. Therefore, partition 126 not only shields capacitor 154 from the out-of-phase field developed by capacitor 142 but also forms part of the end loading capacitance thereby enabling a more compact structure.

In FIG. 5, attenuation or passband characteristic 182 of the filter of FIG. 3 is disclosed. Abscissa 184 of the axes of FIG. 5 is marked off in megahertz (MHz) and ordinate 186 is marked off in decibels. As illustrated by FIG. 5, comb-line filter 110 of FIG. 3 produces minimum attenuation for frequencies within about 5 MHz of the center frequency of the passband of the receiver, i.e., 460 MHz. However, the filter produces up to about 30 decibels attenuation to signals spaced more than 40 MHz away from the center frequency. Although the filters of the desired embodiments of the invention may be used in communication systems, they also may be employed in other types of electronic apparatus.

What has been described, therefore, is a comb-line filter having a unique, inexpensive structure. The resulting filter has little more than one-half the physical length of conventional comb-line filters while maintaining the same electrical length because of the folding of the resonator element thereof. Moreover, the width of the above described comb-line filter can be a predetermined amount because coupling between the resonant cells therein is controlled by partitions rather than by spacing transmission-lines as in conventional comb-line filters. The disclosed filter structures provide either a multi-cell filter which is suitable for use as a preselector, or a two-cell filter which is suitable for use as an antenna filter. The structures of the end-loading capacitors have been designed to provide maximum capacitance in a minimum amount of space and to facilitate tuning of the filter cells.

We Claim:

1. A comb-line filter, including in combination:

conducting housing means having first and second end walls, side wall means joining said first and second end walls, and first and second closing plates connected to said end walls and to said side wall means to form an enclosure therebetween;

a first partition having first and second ends and first and second sides, said first end of said first partition being connected to said first end wall, said first partition extending into said enclosure so that second end is located a first distance away from said second end wall;

a first resonator element having first, second and third connected portions, said first portion having an end connected to said first end wall and a body which is positioned along said first side of said first partition and extending past said second end of said first partition, said second portion being positioned along said second end wall and extending between said second end of said first partition and said second end wall, and said third portion being positioned along said second side of said first partition and having an end located a second distance away from said first end wall;

first capacitor means connected between said end of said third portion and said first end wall;

a first resonant network comprised of said first resonator element, said first capacitor means, said first partition and said housing means;

a second partition having first and second ends and first and second sides, said second partition extending into said enclosure with said first end being connected to said first end wall and said second end located a third distance from said second end wall;

a second resonator element having first, second and third connected portions, said first portion having an end connected to said first end wall and a body positioned along said first side of said second partition and extending past said second end of said second partition, said second portion being positioned along said second end wall and extending between said second end of said second partition and said second end wall, and said third portion having a body positioned along said second side of said second partition and having an end located a fourth distance away from said first end wall;

second capacitor means connected between said end of said third portion of said second resonator element and said first end wall;

a second resonant network comprised of said second resonator element, said second capacitor, said second partition and said housing means; and coupling means electrically coupling said first and second resonant networks to form the comb-line filter.

2. The comb-line filter of claim 1 wherein:

said first portion of said second resonator element is juxtapositioned along said third portion of said first resonator element and along said first capacitor means; and said coupling means is a third partition having a first end connected to said first end wall and extending between said first capacitor means and a part of said first portion of said second resonator element to form a shield therebetween but allowing electromagnetic coupling from said third portion of said first resonator element to the unshielded part of said first portion of said second resonator element.

3. The comb-line filter of claim 1 wherein said third portion of said second resonator element is juxtapositioned along side of said third portion of said first resonator element; and said coupling means is a third partition having a first end connected to said second end wall and extending between said third portions to form a shield therebetween but allowing electromagnetic coupling from said first capacitor means to said second capacitor means.

4. The comb-line filter of claim 1, wherein said first capacitor means is comprised of:

a cylindrical tube having an open end and a closed end, said closed end being coupled to said third portion of said first resonator element and said open end being located near said first end wall; and a second plate formed by a threaded member extending through said first end wall toward said open end of said cylinder.

5. The comb-line filter of claim 7 wherein:

said first portion of said second resonator element is juxtapositioned along side of said third portion of said first resonator element and along side of said first capacitor means; and said coupling means includes a third partition having an end connected to said second end wall and extending between said first portion of said second resonator element and said third portion of said first resonator element to form a shield therebetween but allowing electromagnetic coupling between said first capacitor means and said second resonator element.

6. The comb-line filter of claim 5 further including:

a plurality of said resonant networks being juxtapositioned along side of each other in a tandem manner;

said side wall means having first and second side wall members, said first side wall member being juxtapositioned along side said first portion of said first resonator element and said second side wall member being juxtapositioned along side of said third portion and capacitor of the end most resonator element;

input terminal means being connected through said first side wall member to said first portion of said first resonator element at a predetermined point thereon; and output terminal means being connected through said second side wall member to said third portion of said end-most resonator element at a predetermined point thereon.

7. The comb-line filter of claim 1 wherein:

said third portion of said second resonator element is juxtapositioned alongside of said third portion of said first resonator element; and said coupling means is a third partition having a first end connected to said first end wall and extending between said first and second capacitor means to form a shield therebetween but allowing electromagnetic coupling between said third portions of said first and second resonator elements.

8. The comb-line filter of claim 7 wherein said side wall means includes a first sidewall member juxtapositioned along said first portion of said first resonator element and a second side wall member juxtapositioned along said first portion of said second resonator element;

input terminal means connected through said first side wall member to said first portion of said first resonator element; and output terminal means connected through said second side wall member to said first portion of said second resonator elements.

9. The comb-line filter of claim 7 wherein said first capacitor means is comprised of a first capacitor having:

a first plate formed by a threaded member extending through said first end wall;

a resilient member for receiving said threaded member;

a second plate formed by a cylindrical tube having an open end and a closed end, said open end extending toward said threaded member and said closed end being coupled to said third portion of said first resonator element; and a body enclosing said cylindrical tube.

10. The comb-line filter of claim 9 wherein said first capacitor means further includes a second capacitor having:

a first plate formed by said cylindrical tube;

a dielectric formed by said body; and a second plate including said third partition.

11. A two cell filter structure including in combination:

housing means having first and second end walls, and first and second side walls joining said first and second end walls, said side and end walls having inside and outside surfaces and closing plates connected to said end walls and said side walls to form a conductive enclosure;

a first resonator element having first, second and third integral portions which are at right angles with respect to each other, said first portion having an end connected to said inside surface of said first end wall and a body running generally parallel to said inside surface of said first side wall, and second portion running generally parallel to and located a first distance from said second end wall, and said third portion running generally parallel to said first portion toward said first end wall and having an end located a second distance from said first end wall;

a first rectangular resonator member having a body with first and second ends, said first end of said first rectangular resonator member being connected to said first end wall such that said body thereof runs generally parallel to and in between said first portion and said third portion of said first resonator element;

said first resonator element, said first rectangular resonator member, and said housing means cooperating with each other to form a first equivalent inductance;

first capacitor means connected between said end of said third portion of said first resonator element and said first end wall, said first capacitor means and said first equivalent inductance forming a first resonant cell;

a second resonator element having first, second and third integral portions which are at right angles with respect to each other, said first portion having an end connected to said inside surface of said first end wall and a body running generally parallel to said inside surface of said second side wall, said second portion running generally parallel to and located said first distance from said second end wall, and said third portion running generally parallel to said third portion of said first resonator element toward said first end wall and having an end located said second distance from said first end wall, said third portions of said first and second resonator elements thereby being arranged to couple electro-magnetic energy therebetween;

a second rectangular resonator member having a body with first and second ends, said first end of said second rectangular resonator member being connected to said first end wall such that said body thereof runs generally parallel to and in between said first portion and said third portion of said second resonator element;

said second resonator element and said second resonator member forming a second equivalent inductance;

second capacitor means connected between said end of said third portion of said second resonator element and said first end wall, said second capacitor means and said second equivalent inductance forming a second resonant cell; and shield means extending from said first end wall toward said second end wall, said shield means being located between said first and second capacitor means to prevent coupling therebetween.

12. The comb-line filter of claim 11 wherein each of said first and second capacitors further includes:

a first plate formed by a threaded member extending through said first end wall toward said end of said third portion of said resonator element;

a second plate formed by a cylindrical tube having an open end and a closed end, said closed end being integral with said third portion of said resonator element, said open end of said cylindrical tube extending toward said threaded member; and a third plate formed by said shield means.

* * * * *